United States Patent [19]

Hannan

[11] 4,142,204

[45] Feb. 27, 1979

[54] COLOR IMAGE STORAGE AND DISPLAY UTILIZING HOLOGRAPHY

[75] Inventor: William J. Hannan, Concord, Mass.

[73] Assignee: RCA Corporation, New York, N.Y.

[21] Appl. No.: 849,808

[22] Filed: Nov. 9, 1977

[51] Int. Cl.² .......................... H04N 9/02; H04N 9/54
[52] U.S. Cl. ....................................................... 358/2
[58] Field of Search ....................................... 358/2, 7

[56] References Cited

U.S. PATENT DOCUMENTS

| 3,695,744 | 10/1972 | Clay | 358/2 X |
| 4,001,874 | 1/1977 | Lacotte | 358/2 |

*Primary Examiner*—Robert L. Richardson
*Attorney, Agent, or Firm*—H. Christoffersen; Samuel Cohen; Carl V. Olson

[57] ABSTRACT

A plastic sheet is embossed with three angularly-multiplexed holograms to represent three colors of an image. Light is directed to the holograms from three directions, in sequence, to recreate the three colors of the image in sequence on the face of a black-and-white vidicon. The three field sequential signals from the vidicon are sequentially stored in three solid state frame memories, from which the three color-representing signals are read out simultaneously to the three guns of a color kinescope. Alternatively, the three holograms represent red, blue and luminance, and only red and blue frame memories are required, and during display the luminance-representing signal is repeatedly read out from the vidicon to the color kinescope simultaneously with repeated readout from the red and blue frame memories.

7 Claims, 4 Drawing Figures

COLOR IMAGE STORAGE AND DISPLAY UTILIZING HOLOGRAPHY

The government has rights in this invention pursuant to Contract No. N62269-76-C-0390 awarded by the Department of the Navy.

This invention relates to the storage and display of color still pictures by means different from the conventional means for storing and displaying images from photographic color transparencies or slides. The color images are stored as holograms. The holograms may be made by a replication process and consist of interference patterns embossed on clear plastic film. Such holograms do not include the silver which is used in the making of photographic transparencies. The selective sequential display of color images is useful, for example, for displaying maps to pilots and navigators on aircraft and ships, for advertising products and services, and for educational purposes.

According to an example of the invention, light is directed from three directions, in sequence, to three angularly-multiplexed holograms to produce three frame-sequential images on the face of the black-and-white vidicon camera. At least two of the three sequential electrical signals from the camera are stored in solid state memories, and read out simultaneously to a color kinescope display unit.

Figure 1:
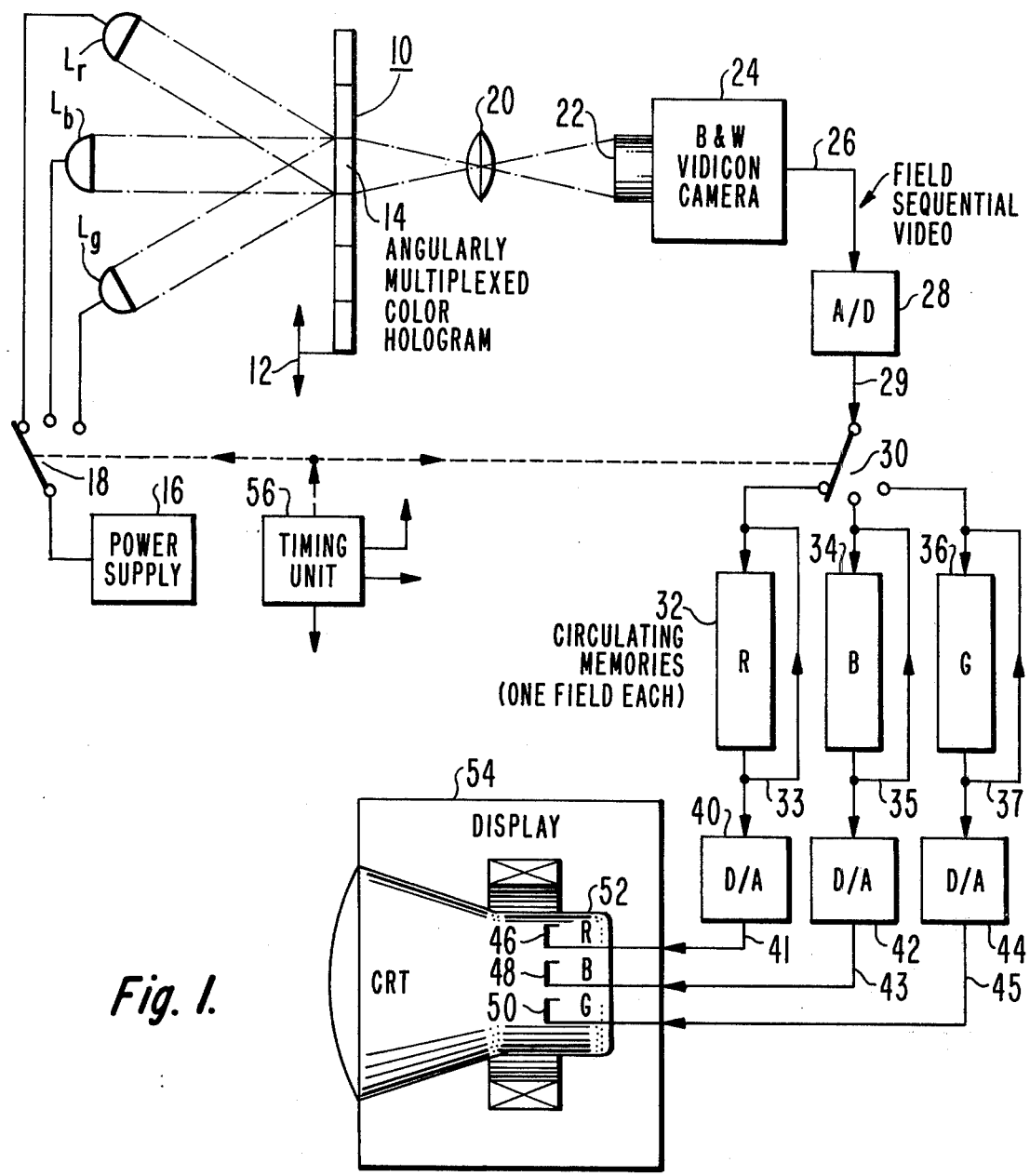
FIG. 1 is a diagram of a color image storage and display system including three solid state frame memories.

Referring now in greater detail to FIG. 1, an array 10 of angularly-multiplexed holograms is mounted for movement, as represented by the arrows 12, so that any one of the holograms, such as the hologram 14, can be positioned for the readout and display of the color image stored thereon. Each hologram such as 14 consists of three sets of interference patterns at three different angles, each pattern representing one of the three colors red, blue and green of the image stored. The interference patterns may consist of density variations in the film, or thickness variations in the film.

The hologram may be made in a manner fully described in U.S. Pat. No. 3,695,744 issued on Oct. 3, 1972, to B. R. Clay and entitled "Holographic Multicolor Technique," or in the manner described in U.S. Pat. No. 4,001,874 issued on Jan. 4, 1977, to J. P. Lacotte and entitled "Method Apparatus and Record for Distributive Information in the Form of Color Images." To make the hologram, a laser reference beam at a first angle, and an object beam from a red color separation of the image, are directed to a hologram recording medium. Then, the reference beam at a second angle, and a second object beam from a blue color separation of the image are directed to the recording medium. Finally, the reference beam at a third angle, and a third object beam from a green color separation of the image, are directed at a third angle to the recording medium. The exposed recording medium is then developed in conventional fashion so as to permanently fix the recorded images. The three color images represented by the three interference patterns may be individually read out by three light sources positioned at the same three angles used for recording the hologram.

In FIG. 1, three light sources $L_r$, $L_b$ and $L_g$ are positioned in accordance with the three respective angles of the reference beams used for recording the red, blue and green color separations on the hologram recording medium. The light sources may consist of identical (uncolored) incandescent light sources such as ordinary flashlight bulbs, or preferably, identical white-light electronic flash lamps. The light sources are energized in sequence from a power supply 16 by means of a switch 18. When any one of light sources $L_r$, $L_b$ and $L_g$ is energized, a black-and-white image corresponding with the red or blue or green color separation of the image is created and imaged by a lens 20 on the face 22 of a black-and-white (B & W) vidicon camera 24. The camera 24 produces an electrical output at 26 which is a field sequential video signal in analog form.

The signal from camera 24 is applied through an analog-to-digital (A/D) converter 28 and through a switch 30 to the input of a red circulating memory 32, a blue circulating memory 34 or a green circulating memory 36. The A/D converter samples the analog signal it receives, and for each picture element sample produces an equivalent multi-bit signal on an equal number of conductors of its output line 29. Each digital signal may, for example, consist of six bits on six conductors to represent any one of $2^6$ or 64 amplitude levels of the analog signal sample. The switch 30 provides parallel paths for six digits. The circulating memories 32, 34 and 36 each may consist of six parallel solid state shift registers which receive the digital signals of an entire color field. The stored digital signals then continuously recirculate via respective return paths 33, 35 and 37. Alternatively, the circulating memories may consist of random access memories provided with cyclically operated addressing means so that they act like shift register loops.

The digital signals representing a red, a blue and a green field which are sequentially stored in and continuously recirculated in memories 32, 34 and 36, respectively, are simultaneously applied to respective digital-to-analog (D/A) converters 40, 42 and 44. The converters convert each digital signal representing a color picture element to an analog signal sample of corresponding amplitude. The analog signals on lines 41, 43 and 45 are applied to respective electron guns 46, 48 and 50 of a color cathode ray tube kinescope 52 in a color display unit 54. A timing unit 56 controls the switches 18 and 30 (which of course are electronic switches) and also controls, in the usual ways, the timing of the camera 24, the converter 28, the memories 32, 34, 36, the converters 40, 42 and 44, and the kinescope display unit 54.

The operation of the system of FIG. 1 will be described with reference to the timing diagram of FIG. 2. First, the lamp $L_r$ is energized at a time designated $L_1$ in FIG. 2 to illuminate the hologram 14 from an angle which results in the readout of the red-representing color separation image to the face 22 of B & W vidicon camera 24. The image remains on the face 22 of the vidicon camera during the time designated $R^1$ in FIG. 2 that the vidicon camera scans the red field image on face 22 and produces a serial electrical signal representing a line-by-line scanning of the entire red field. The resulting serial analog electrical signal is converted by A/D converter 28 to digital form and the serial digital signal is stored in red-field circulating memory 32.

Thereafter, the red-field signal is continuously recirculated through the red-field memory.

Figure 2:
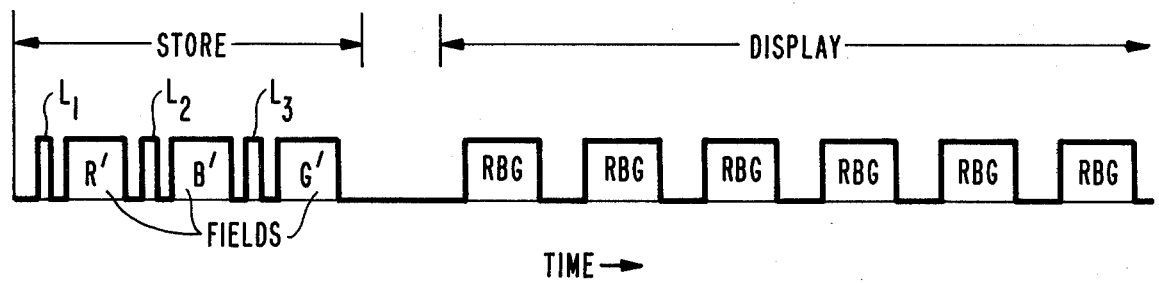
FIG. 2 is a timing chart which will be referred to in describing the operation of the system of FIG. 1.

At the time designated $L_2$ in FIG. 2, the light $L_b$ is energized to illuminate the hologram 14 from an angle which results in the readout of the blue-representing color separation image on the face 22 of camera 24. During time B' in FIG. 2, the signal from camera 24 is converted to digital form and stored in blue memory 34, and then continuously recirculated through the blue memory. At time $L_3$ the lamp $L_g$ is energized, and at time G', the green-representing field is converted to digital form and stored in green-memory 36, and thereafter recirculated through the green-memory 36. At this time, at the end of the period labeled "STORE" in FIG. 2, the sequentially-produced and stored digital signals are simultaneously available from the three circulating memories.

The operation then changes, under control of timing unit 56, to a "DISPLAY" mode. During the first time period labeled RBG in FIG. 2, the digital signals are converted to respective analog signals in converters 40, 42 and 44 and are applied to the red, blue and green guns 46, 48 and 50, respectively, of the color kinescope 52. The successive time periods RBG in FIG. 2 each represent time periods during which signals have again circulated through memories 32, 34 and 36 and are used to refresh the the complete color image on the face of the color kinescope 52. The display of the color image stored in the recirculating memories can be continued indefinitely, or until it is desired to store a different image in the circulating memories.

Figure 3:
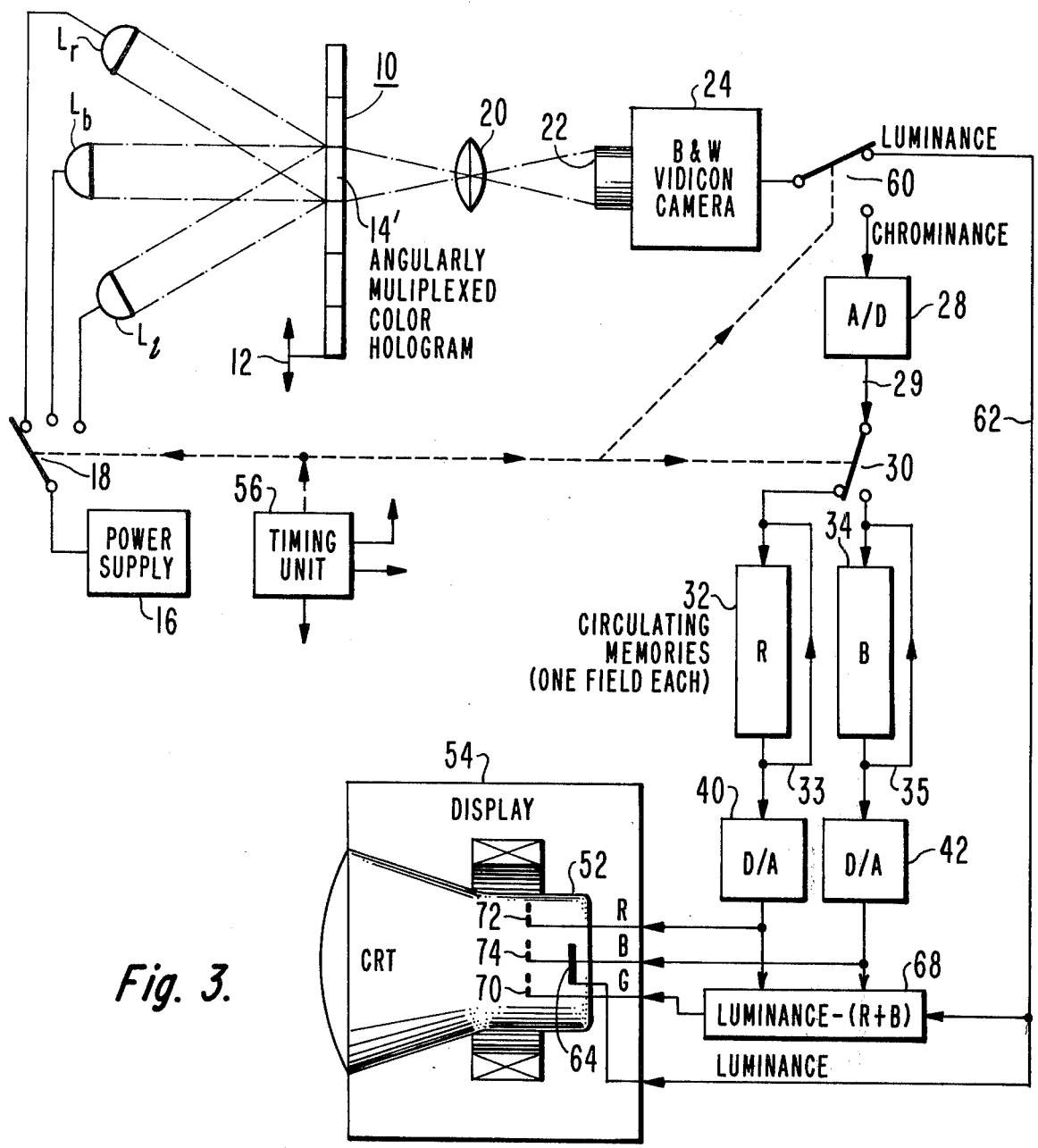
FIG. 3 is a diagram of a color image and display system including only two solid state frame memories.

FIG. 3 shows a modified system. Elements which are the same as those in FIG. 1 are given the same reference numerals. The system of FIG. 3 is different in that it includes solely two circulating field memories 32 and 34 for red and blue fields, thereby saving the expense of the third green field memory and the associated D/A converter. In FIG. 3 the hologram 14' includes diffraction gratings corresponding with a red color separation of the image, a blue color separation of the image and a liminance separation of the image. The output of the B & W vidicon camera 24 can be connected through a switch 60 to the A/D converter 28, or over a line 62 to a common cathode 64 in the color kinescope 52, and to a circuit 68 which produces a green signal for green grid 70 by subtracting red and blue signals from the liminance signal.

The operation of the system of FIG. 3 will be described with reference to the timing chart of FIG. 4. Initially at time $L_1$, the lamp L is energized to cause the red-representing image to appear on the face of the B & W vidicon camera 24 for storage thereon. During time R", the vidicon scans the image and produces a red-representing field signal which is stored in red circulating memory 32, and thereafter continuously recirculates, exactly as has been described in connection with FIG. 1. The operations during times $L_2$ and B" are also the same as has been described in connection with FIG. 1.

Figure 4:
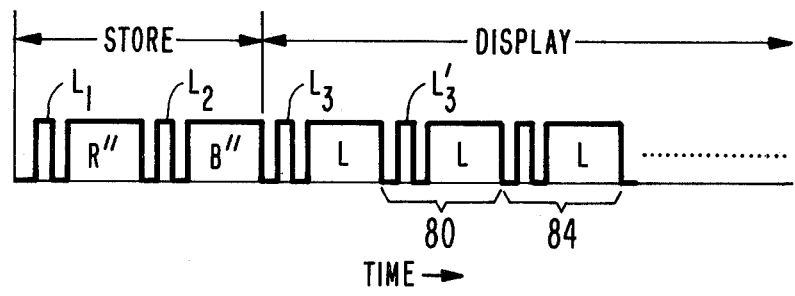
FIG. 4 is a timing chart which will be referred to in describing the operation of the system of FIG. 3.

During the time $L_3$ in FIG. 4, the lamp $L_1$ is energized to cause the luminance-representing image to appear on the face of the camera 24 and to result, during time L, in a line-by-line electrical analog signal, corresponding to the luminance component of the image. This luminance signal is applied through switch 60 and directly along line 62 to the common cathode 64 of the color kinescope 52, and to the green-signal-generating circuit 68. The circuit 68 generates a green signal which is connected to the grid 70 of the green gun in the kinescope. During the same time period L, the red-representing and blue-representing signals are available from D/A converters 40 and 42 and are applied to red and blue grids 72 and 74, respectively, and to the green-signal-generating circuit 68. The circuit 68 generates a green signal by subtracting the red and blue signals from the luminance signal.

In a next cycle 80 of display operation, lamp $L_1$ is energized at time $L'_3$ and the camera 24 produces a luminance signal which is supplied to the color kinescope simultaneously with the application thereto of red and blue signals from respective circulating memories, and a green signal from circuit 68. An alternative approach is to operate lamp $L_1$ continuously after turn-on at time $L'_3$, since the same luminance image is to be read out thereafter.

The display cycle is again repeated at time 84, and is repeated as long as is desired, or until the chrominance component of a different color image is to be stored in the circulating memories and then displayed. It is seen that the system of FIG. 3 repeatedly uses the vidicon camera 24 to produce the luminance signal for combination with the chrominance signals from the circulating memories. In this way the system avoids the need for the third circulating memory 36 included in the system of FIG. 1.

In addition to requiring only two circulating memories 32 and 34, the system of FIG. 3 is advantageous because the two circulating memories may be smaller than the corresponding memories in FIG. 1. This is because the memories in FIG. 3 are used to store the chrominance information in the image. The human eye does not perceive the color in an image in as fine detail as it perceives the luminance. Therefore, the circulating memories which store solely the chrominance information need have relatively few storage locations, and the cost of the memories is correspondingly reduced.

What is claimed is:

1. A color image storage and display system, comprising a hologram having two angularly-related gratings representing two respective colors in an image, a black-and-white vidicon camera positioned to receive diffracted light from said hologram, means successively to illuminate said hologram from two different angles to successively read out two respective color-representing images onto the face of said black-and-white vidicon camera, two circulating memories each receiving from said camera electrical video signals representing a respective color field of the image, a cathode ray tube color display unit, and means repeatedly to apply the two video signals from the two memories in parallel to the color display unit, whereby to display the color image recorded on said hologram.

2. A system according to claim 1 wherein said circulating memories are solid state digital memories, and an analog-to-digital converter is provided between said vidicon camera and said memories, and analog-to-digital converters are provided between said memories and said display unit.

3. A system according to claim 1 wherein in hologram includes a third angularly-related grating representing a third color of the image, said means to illuminate from a third different angle, and a third circulating memory is provided for receiving video signals representing a third color field of the image for application in parallel with the other signals to the display unit.

4. A system according to claim 1 wherein said hologram includes a third angularly-related grating representing the luminance of the image, said means to illuminate includes means to illuminate from a third different angle, and means are provided repeatedly to apply the luminance field signal from the camera to the color display unit in parallel with the application thereto of the two color field signals.

5. A color image storage and display system, comprising
- a hologram having three angularly-related gratings representing three respective colors in an image,
- a black-and-white vidicon camera positioned to receive diffracted light from said hologram,
- means successively to illuminate said hologram from three different angles to successively read out light representing respective colors in the image onto the face of said vidicon camera,
- an analog-to-digital converter connected to convert the analog electrical signal from said vidicon camera to a digital signal,
- three circulating memories each receiving from said analog-to-digital converter electrical video signals representing a respective color field of the image, and continuously circulating the signals,
- three digital-to-analog converters each coupled to the output of a respective circulating memory,
- a CRT color display unit, and
- means repeatedly to apply the three video signals from the three digital-to-analog converters in parallel to the color display unit, whereby to display the color image recorded on said hologram.

6. A color image storage and display system, comprising
- a hologram having three angularly-related gratings representing two respective colors and luminance in an image,
- a black-and-white vidicon camera positioned to receive diffracted light from said hologram,
- means successively to illuminate said hologram from three different angles to successively read out light representing the two colors and the luminance in the image onto the face of said vidicon camera,
- an analog-to-digital converter connected to convert the analog electrical signal from said vidicon camera to a digital signal,
- two circulating memories each receiving from said analog-to-digital converter two electrical video signals representing a respective color field of the image and continuously circulating the signals,
- two digital-to-analog converters each coupled to the output of a respective circulating memory,
- a cathode ray tube color display unit, and
- means repeatedly to apply color field signals from said circulating memories and luminance field signals from said camera in parallel to said color display unit.

7. A system according to claim 6, and in addition a circuit for applying a third color signal to said color display unit, comprising means for subtracting the two color signals at the output of said two analog-to-digital converters from said luminance signal at the output of said vidicon camera.

* * * * *